United States Patent
Webb et al.

(10) Patent No.: US 7,824,134 B2
(45) Date of Patent: Nov. 2, 2010

(54) CUTTING TOOL INSERTS AND METHODS TO MANUFACTURE

(75) Inventors: Steven W. Webb, Worthington, OH (US); Joseph T. Eiler, Gahanna, OH (US)

(73) Assignee: Diamond Innovations, Inc., Worthington, OH (US)

( * ) Notice: Subject to any disclaimer, the term of this patent is extended or adjusted under 35 U.S.C. 154(b) by 188 days.

(21) Appl. No.: 12/020,329

(22) Filed: Jan. 25, 2008

(65) Prior Publication Data

US 2008/0138162 A1   Jun. 12, 2008

Related U.S. Application Data

(63) Continuation of application No. 10/690,761, filed on Oct. 22, 2003, now Pat. No. 7,322,776.

(60) Provisional application No. 60/470,306, filed on May 14, 2003.

(51) Int. Cl.
   B23B 27/16   (2006.01)
(52) U.S. Cl. .................. 407/113; 407/118; 407/119
(58) Field of Classification Search ................. 407/113, 407/118, 119; B23B 27/16
   See application file for complete search history.

(56) References Cited

U.S. PATENT DOCUMENTS

| | | | |
|---|---|---|---|
| 653,165 A | 7/1900 | Bedford et al. | |
| 885,770 A | 4/1908 | Lucas | |
| 2,944,323 A | 7/1960 | Stadler | |
| 3,369,283 A | 2/1968 | Bertil Colding | |
| 3,792,515 A * | 2/1974 | Lundgren | 407/116 |
| 3,990,329 A | 11/1976 | Laurin | |
| 4,200,159 A | 4/1980 | Peschel et al. | |
| 4,437,800 A * | 3/1984 | Araki et al. | 407/119 |
| 4,457,765 A | 7/1984 | Wilson | |
| 4,558,974 A | 12/1985 | Pano | |
| 4,561,810 A | 12/1985 | Ohno | |
| 4,690,691 A * | 9/1987 | Komanduri | 51/293 |
| 4,714,385 A | 12/1987 | Komanduri | |
| 4,866,885 A | 9/1989 | Dodsworth | |
| 4,884,476 A * | 12/1989 | Okuzumi et al. | 76/101.1 |
| 4,909,677 A | 3/1990 | Noguchi et al. | |
| 4,991,467 A | 2/1991 | Packer | |
| 5,075,181 A | 12/1991 | Quinto et al. | |
| 5,115,697 A | 5/1992 | Rodriguez et al. | |
| 5,139,372 A | 8/1992 | Tanabe et al. | |
| 5,147,158 A | 9/1992 | Riviere | |

(Continued)

FOREIGN PATENT DOCUMENTS

DE   1054306   4/1959

(Continued)

*Primary Examiner*—Boyer D Ashley
*Assistant Examiner*—Sara Addisu
(74) *Attorney, Agent, or Firm*—Maria C. Gasaway

(57) ABSTRACT

A cutting insert includes a cutting insert body having a plurality of openings, a plurality of cutting tips, and a braze joint between each of the cutting tips and the cutting insert body. Each of the cutting tips may be disposed in a respective opening of the insert body. The cutting tips include an intermediate feature and a tip portion. The intermediate feature has a geometry that provides a mechanical bond when inserted into an opening of the cutting insert body.

20 Claims, 7 Drawing Sheets

U.S. PATENT DOCUMENTS

| | | | |
|---|---|---|---|
| 5,154,550 | A | 10/1992 | Isobe et al. |
| 5,183,362 | A | 2/1993 | Kuroyama et al. |
| 5,193,948 | A | 3/1993 | Noggle |
| 5,370,717 | A | 12/1994 | Lloyd et al. |
| 5,536,119 | A | 7/1996 | Werner et al. |
| 5,569,000 | A | 10/1996 | Littecke et al. |
| 5,594,931 | A | 1/1997 | Krall et al. |
| 5,598,621 | A | 2/1997 | Littecke et al. |
| 5,676,496 | A | 10/1997 | Littecke et al. |
| 5,712,030 | A * | 1/1998 | Goto et al. .................. 428/332 |
| 5,829,924 | A | 11/1998 | Oshnock et al. |
| 5,846,032 | A * | 12/1998 | Murakami .................. 407/102 |
| 5,984,593 | A | 11/1999 | Bryant |
| 6,029,544 | A * | 2/2000 | Katayama .................. 76/108.6 |
| 6,099,209 | A | 8/2000 | Murray et al. |
| 6,106,585 | A | 8/2000 | Packer et al. |
| 6,120,570 | A | 9/2000 | Packer et al. |
| 6,155,755 | A * | 12/2000 | Kanada et al. .............. 407/118 |
| 6,161,990 | A | 12/2000 | Oles et al. |
| 6,286,406 | B1 | 9/2001 | Viswanadham et al. |
| 6,503,027 | B2 | 1/2003 | Men |
| 6,511,265 | B1 | 1/2003 | Keller et al. |
| 6,540,450 | B2 * | 4/2003 | Gatton et al. ............... 407/113 |
| 6,543,970 | B1 | 4/2003 | Qvarth et al. |
| 6,579,045 | B1 | 6/2003 | Fries et al. |
| 6,599,062 | B1 * | 7/2003 | Oles et al. .................... 407/119 |
| 7,059,811 | B2 | 6/2006 | Okamura et al. |
| 7,322,776 | B2 | 1/2008 | Webb et al. |
| 2002/0112408 | A1 | 8/2002 | Rolander |
| 2002/0112590 | A1 | 8/2002 | Bohner et al. |
| 2002/0190105 | A1 | 12/2002 | Kanada et al. |
| 2004/0228694 | A1 | 11/2004 | Webb et al. |
| 2004/0237723 | A1 * | 12/2004 | Kanada et al. ................ 76/115 |
| 2005/0152804 | A1 | 7/2005 | Sjogren |
| 2005/0183893 | A1 | 8/2005 | Sjogren et al. |
| 2005/0271483 | A1 | 12/2005 | Sjogren |
| 2007/0207715 | A1 * | 9/2007 | Webb ......................... 451/540 |

FOREIGN PATENT DOCUMENTS

| | | |
|---|---|---|
| DE | 41 00 351 A1 | 7/1991 |
| DE | 102 58 133 A1 | 6/2004 |
| EP | 0291933 B1 | 8/1991 |
| EP | 1081119 B1 | 12/2002 |
| FR | 2 691 657 | 12/1993 |
| FR | 2 706 339 | 12/1994 |
| GB | 860478 | 2/1961 |
| JP | 59016911 | 1/1984 |
| WO | WO 97/29885 A1 | 8/1997 |
| WO | WO2004103617 | 2/2004 |
| WO | WO 2004/105983 A1 | 12/2004 |

* cited by examiner

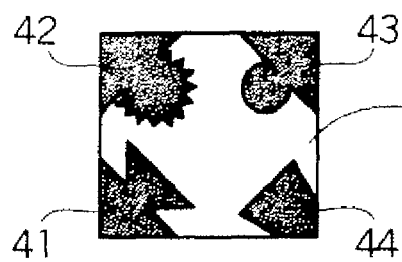 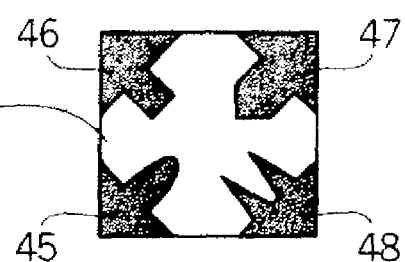
FIG. 5A  FIG. 5B
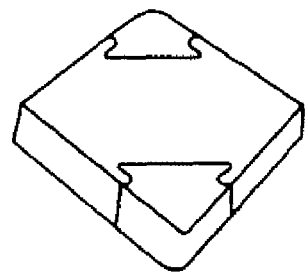 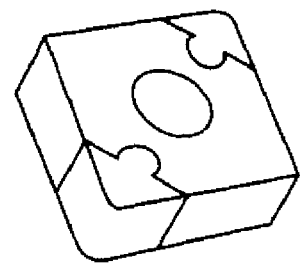
FIG. 6A  FIG. 6B
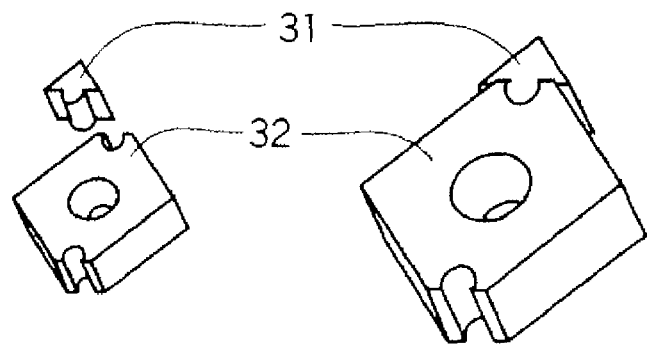
FIG. 7

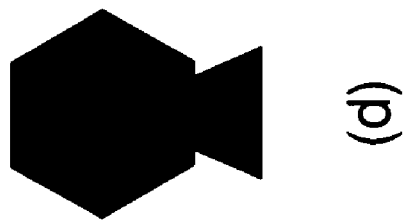
(d)
(c)
FIG. 11
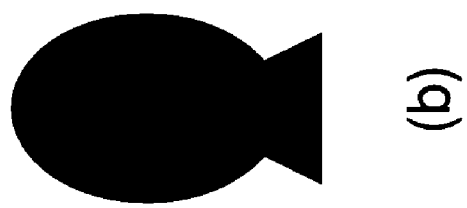
(b)
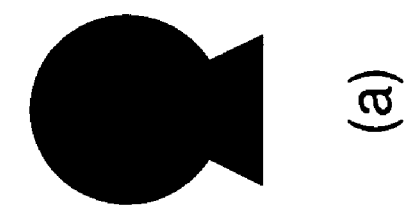
(a)

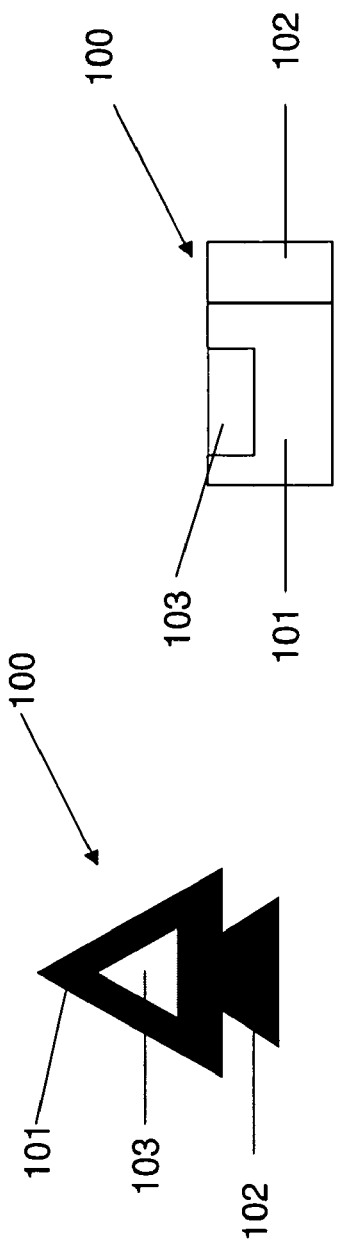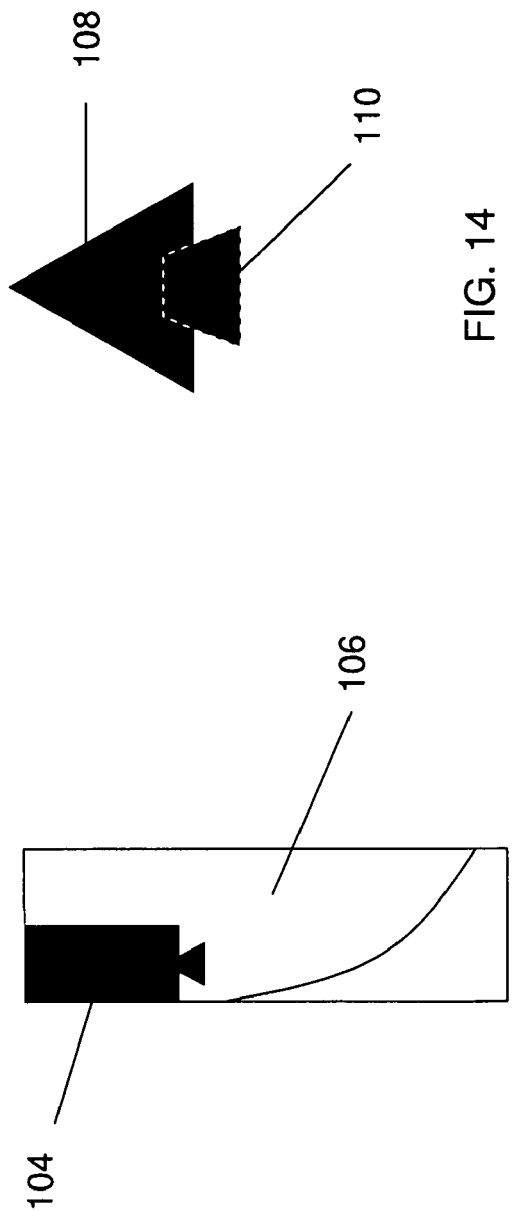

CUTTING TOOL INSERTS AND METHODS TO MANUFACTURE

CROSS-REFERENCE TO RELATED APPLICATIONS

This application claims priority to, and is a continuation of co-pending U.S. patent application Ser. No. 10/690,761, filed Oct. 22, 2003, which claims priority to U.S. Provisional Patent Application Ser. No. 60/470,306, filed on May 14, 2003.

TECHNICAL FIELD

The present invention relates to cutting tool inserts, wherein an abrasive tip comprising an abrasive/superabrasive material is bonded to an insert body by mechanical forces generated through deformation of mating geometric features on the abrasive tip and insert body.

BACKGROUND OF THE INVENTION

Machining, cutting, sawing or drilling tools are often provided with removable inserts comprising conventional materials such as cemented carbides, ceramics (e.g., $Si_3N_4$, TiC—$Al_2O_3$ composites), and high-speed steel. As depicted in FIG. 1, insert 1 is held firmly and locked into a tool holder 5 by a screw or other clamping mechanism 4. In machining operations, the insert is held in contact with the work piece and eventually wears to a point wherein it requires replacement. Inserts are, by definition, a disposable part of the machine tool system.

Superabrasive materials containing diamond (e.g. polycrystalline diamond or PCD) and/or cubic boron nitride (e.g. polycrystalline cubic boron nitride, PCBN) provide enhanced machining performance over conventional materials (tool life, surface finish, tolerance capability, etc.) and are also widely used as tool inserts. Due to the high material cost of superabrasives, fabrication techniques have been developed and optimized to reduce the usage (in $mm^2$) of superabrasives on the insert. One such technique is the manufacture of "tipped inserts," which is also depicted in FIG. 1. The tipped insert consists of an insert body 3 and an abrasive tip 2 of superabrasive material, with the insert body being typically fabricated out of cemented tungsten carbide. The superabrasive tip 2 is attached to a corner or edge of the insert body by a brazing process. Brazing provides sufficient binding force to withstand the cutting forces and heat and is convenient for attaching small abrasive tips.

Polycrystalline diamond ("PCD") and cubic boron nitride ("PCBN") are commonly manufactured bonded to cemented carbide to form a two-layer disk, with PCD or PCBN on one side and cemented carbide on the other. This is done to facilitate insert fabrication via braze attachment. The carbide side of the PCD or PCBN tips is easily brazed to carbide tip holders to make brazed inserts of the prior art. Directly brazing PCD or PCBN to carbide is challenging as the braze metal must spread over and bind quite dissimilar materials.

Although the prior art brazing process does reduce the material cost of manufacturing superabrasive inserts, the process, and in particular the brazing operation itself, is labor intensive. In this process, as illustrated in FIG. 2, an abrasive disc 11 is machined via EDM, EDG, or other processes, into a desired shape, e.g., an 80° triangle, forming an abrasive tip 12. A suitably sized pocket is ground in the insert body 13 to form the site for attaching the abrasive tip. The bottom rear edge of the abrasive tip may be chamfered to avoid stress buildup at the otherwise sharp corner where the abrasive tip will meet with the insert body 13. In the next step, a braze material, typically a metal paste, powder or foil, 14 is placed between the chamfered abrasive tip 15 and the pocketed insert body 16. A flux material may be applied to inhibit braze oxidation. The assembly is heated to a temperature above the liquidus of the braze material causing it to melt. Upon cooling, the metal freezes as a thin film binding the abrasive tip and insert body, forming the semi-finished insert, 17. The edges of the insert can then be ground to final dimensions and sharpness to produce the finished insert 18. The brazing process is labor intensive because the operator has to pay close attention to the joint interface, i.e., the abrasive tip, the braze interface layer, and the insert body, and reposition the materials, when molten, as necessary to assure good bonding. The ultimate location of the abrasive tip within the insert body and the quality of its attachment can be variable due to variable braze metal flow and the need for this manual positioning.

A difficulty in the brazing process is that tool materials of different composition or grain size frequently require different brazing conditions, i.e., temperatures, times, braze metal formulations. Additionally, brazing dissimilar materials e.g., a cubic boron nitride tip to cemented carbide insert body requires special braze alloys and conditions capable of bonding both materials simultaneously in the same process cycle. PCBN and PCD are known to be difficult to wet with brazes unless active metals, such as Ti or Fe, are incorporated into the metal formula. Such active metals are oxidation sensitive and may require use of an inert atmosphere or vacuum furnace, or very fast induction brazing, to improve the bond. They also require higher temperatures that may lead to degradation of the superabrasive material.

A further disadvantage of conventionally brazed inserts is that once formed, they cannot be heated above the sublimation or liquidus temperature of the braze metal in subsequent processing steps, such as, for example, chemical vapor deposition (CVD) coating of the insert. Low melting metals used in braze alloys, e.g., Sn, Zn, are volatile and the braze bond will be impaired and/or vacuum components contaminated by thermal treatment after brazing. Additionally, damage to the abrasive tip or insert body from the thermal expansion/contraction cycle during brazing is possible, requiring brazing temperature and time to be kept to a minimum. In some cases, rebrazing tips to correct braze flaws or regrind tips is not possible. Furthermore, heat generated at the tip during cutting may damage the braze attachment, allowing the tip to displace in the holder. This will disrupt the cutting operation.

There are a number of references in the prior art for specialized tools that preclude the brazing requirements, including U.S. Pat. No. 5,829,924 titled "Cutting Tool with Insert Clamping Mechanism," U.S. Pat. No. 4,909,677 titled "Throw Away Cutting Tool," U.S. Pat. No. 5,154,550 titled "Throw Away Tipped Drill Bit," and U.S. Pat. No. 4,558,974 titled "Tool System for Precision Slotting." The prior art teachings rely on exact and complex geometrical configurations of an insert and tool holder to assure that the insert is securely gripped by the tool holder in operation. These references employ mechanical means of holding an insert in a tool holder and not holding an abrasive tip within the insert body itself.

One solution for eliminating the brazing requirements in tipped inserts was recently made commercially available and is illustrated in FIG. 3. The insert system incorporates a reusable insert body, wherein the insert body itself acts as a clamp for holding an abrasive tip. As shown, the insert body is sectioned down the central vertical plane, connecting a set of jaws on one corner to a relief hole near the opposite corner.

The relief hole and central vertical cut allow reversible movement of the jaws within the horizontal plane of the insert body. The insert assembly is used with a specially designed tool holder that forces the insert back into a v-block when the clamping mechanism is tightened, squeezing the jaws on the insert body together and to firmly hold the abrasive tip in place during the machining operation. Removing the insert from the tool holder allows the insert body to spring back to its original state, allowing the jaws to open so that the tip can be removed and replaced. Abrasive tips are finish ground (i.e., chamfered sharpened, and/or honed) before clamping into the insert body.

Because of the reusable nature of the above-described inserts, the deformation of the insert body and resultant clamping force must be reversible. If the jaws on the insert body are pried open or forced together to the extent that the insert body material yields at the corner opposite to the jaws, it will not spring back to its original state. Replacement abrasive tips would then have to be manufactured with progressively larger (or smaller) mating features to fit the insert body, posing significant complexity in manufacturing of the abrasive tips and application of the insert system. Another disadvantage is that the design limits the insert body to holding only one abrasive tip. Thus, the insert can not be indexed, i.e. rotated in the tool holder to use another corner as the cutting edge. It must be removed and refitted with a replacement abrasive tip, increasing the down time in operation. Lastly, with the abrasive tips being ground finished separate from the reusable insert body, dimensional differences between abrasive tips are imparted to the assembled insert. This may require recalibration of the positioning of the cutting edge with respect to the workpiece every time the abrasive tip is changed, else there is a risk of imparting dimensional differences in abrasive tips to the part being machined with resulting decreased dimensional capability and increased part scrap rate.

There is a need for an improved, inexpensive, convenient, versatile insert system that eliminates the problems and costs associated with brazing without the increased complexity and limited utility of non-brazed inserts of the prior art. There is also a need for an insert that is simple and dimensionally precise, requiring minimal subsequent grinding for dimension control and sharpening. Lastly, there is a need for an insert system that enables abrasive tips and insert body materials to be selected without regard to their brazing compatibility, allows grinding of the assembled inserts, and enables post processing at high temperatures (e.g., CVD coating or hardening via thermal processing).

SUMMARY

In an embodiment, a cutting insert includes a cutting insert body having a plurality of openings, a plurality of cutting tips, and a braze joint between each of the cutting tips and the cutting insert body. Each of the cutting tips may be disposed in a respective opening of the insert body. The cutting tips include an intermediate feature and a tip portion. The intermediate feature has a geometry that provides a mechanical bond when inserted into an opening of the cutting insert body. The intermediate feature may be formed of a different material than the tip portion. The tip portion is made of a superabrasive material such as cubic boron nitride or polycrystalline diamond, and it has a cutting edge.

Optionally, the geometry includes a generally trapezoidal anchor portion with its base substantially flat and spaced away from a cutting edge of the cutting tip. The geometry may be in the form of a dovetail. In some embodiments, the cutting insert may be in the shape of a square, triangle, diamond, parallelogram, hexagon, octagon, pentagon, trigon, rectangle, trapezoid or round body The tip portion also may include any of the following: a metal, alloy, or mixture thereof, or a carbide, boride or mixture thereof. For example, the tip portion may include cubic boron nitride or polycrystalline diamond particles and a bonding matrix comprising a metal or alloy thereof. In some embodiments, each cutting tip includes two cutting edges. The cutting insert body may include, for example, a cemented carbide, steel, titanium, plastic, ceramic, metal or metal alloy.

Each cutting tip may be in the shape of a circle, oval, octagon, hexagon, or partial or complete ring shape. The geometry of each cutting tip may include a male feature that is shaped to fit within a female feature of the insert body. In such situations, the male feature may include, for example, a flaring tenon, lip, rounded shape, circular pattern, or wedge. Each opening may have a shape that is a mating geometric feature to the geometry of at least one of the cutting tips.

Optionally, the cutting tip may include a chip-breaking pattern. Optionally, the cutting insert may include two cutting edges, or four cutting edges. The cutting tips may be arranged symmetrically about the insert body. In some embodiments, the cutting insert may be a turning insert, or disposed on a drill.

BRIEF DESCRIPTION OF THE DRAWINGS

FIGS. 5A and 5B show the top view of two embodiments of the invention, one interlocking embodiment and one non-interlocking embodiment.

FIGS. 6A and 6B are photographs showing perspective views of inserts made by press-fit embodiments of the current invention.

FIG. 7 is a perspective view of another embodiment of the present invention, in which an abrasive tip and insert body have mating and interlocking circular features for mechanical bonding.

FIG. 11 (a)-d)) show top views of embodiments of the invention.

FIG. 12 a) shows the top view of an embodiment of the invention.

FIG. 12 *b*) shows the side view of an embodiment of the invention.

FIG. 13 is a side view of an embodiment of the invention.

FIG. 14 is a top view of an embodiment of the invention.

DETAILED DESCRIPTION

Figure 1:
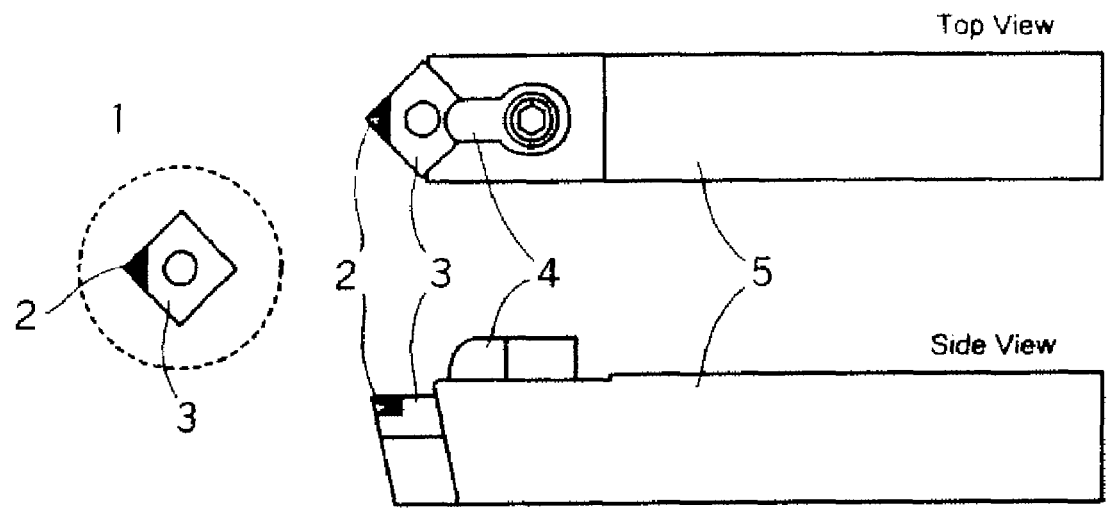
FIG. 1 is an example of a tooling setup for turning in top and side view. The setup consists of an insert 1, comprising an abrasive tip 2 brazed to an insert body 3, which is held in a tool holder 5 by a clamping mechanism 4.
Figure 2:
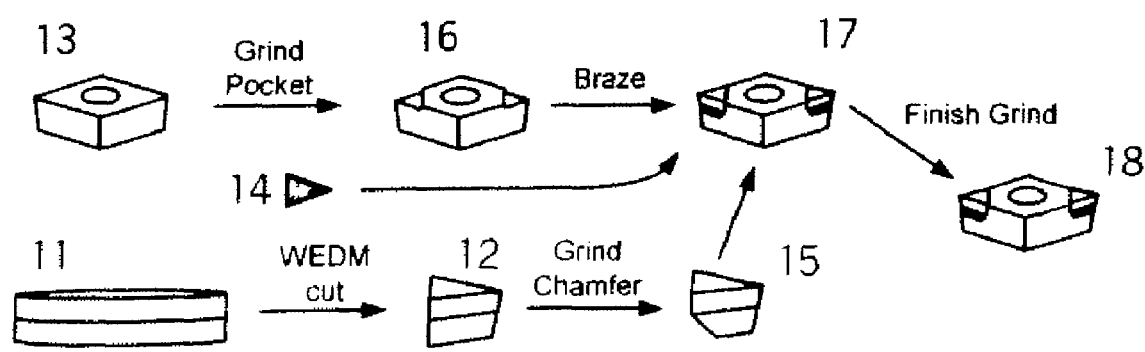
FIG. 2 is a diagram showing the multi-step process in forming a brazed tool insert of the prior art.
Figure 3:
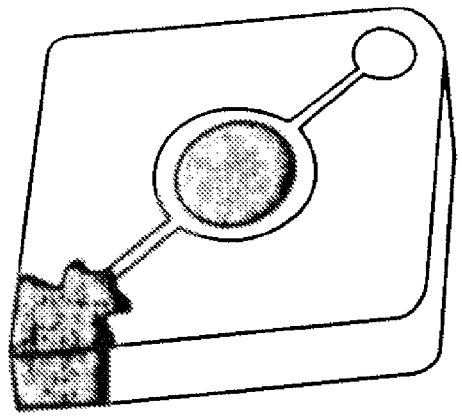
FIG. 3 is a photograph of a non-brazed insert of the prior art.

As used herein, the term "insert" refers to pieces of tungsten carbide or alternative cutting material mechanically held, brazed, soldered, or welded into position on dies or cutting tools, and discarded when worn out, others being fitted in their place. An example is illustrated in FIG. 1. Also see *A Dictionary of Machining* (Eric N. Simmons, Philosophical Library, New York, 1972).

As used herein, the term "tool holder" refers to the rigid body that holds an insert or inserts firmly in place so that they can be utilized in a turning, milling, boring, cutting, or drilling application (see for example FIGS. 1 and 5).

As used herein, the term "tipped insert" refers to a cutting tool made up of a body (herein referred to as the insert body and depicted as item 3 in FIG. 1) and a tip of some hard cutting alloy (herein referred to as the abrasive tip and depicted as item 2 in FIG. 1). Also see *A Dictionary of Machining*. Tipped inserts enable expensive materials to be economically used for cutting difficult materials, whereas in solid tool form they would cost far too much.

As used herein, the term "mating geometric features" refers to features (or surfaces) on an insert body and abrasive tip that are capable of joining (or allow joining of) said insert body and abrasive tip by mechanical forces, for example, a tip comprising a male feature that is shaped to fit within a female feature of another piece. The mating geometric features can be of similar contour, for example, a circular male feature fitting inside a circular female feature, or dissimilar contour, for example, a square male feature fitting inside a circular female feature. If dimensioned properly, the male and feature pieces can generate an interference fit.

As used herein, the term "interference fit" refers to a size mismatch between mating geometric features that results in deformation of one or both features when joined. The deformation, which can be elastic and reversible or plastic and irreversible, creates large normal and frictional forces between the parts.

As used herein, the term "reversible deformation" refers to the material flow in a body caused by application of load that is below the yield strength of the material comprising the body. When said load is removed (or, for example, press-fit bodies are separated), the body will return to its original dimensions.

As used herein, the term "irreversible deformation" refers to the material flow in a body caused by application of load that is above the yield strength of the material comprising the body. When said load is removed (or, for example, press-fit bodies are separated), the body will not return to its original dimensions.

As used herein, the term "interlocking geometric features" refers to mating geometric features on the abrasive tip and insert body, wherein the cross-sectional area of the female feature is smaller at some distance x that is closer to the cutting edge on the abrasive tip than it is at some distance x+y, that is farther away from the cutting edge of the abrasive tip. Illustrative examples of interlocking mating geometries are depicted in FIG. 5A 41-44. Illustrative examples of mating geometries that are NOT interlocking are depicted in FIG. 5B, 45-48.

In the present invention, abrasive tips are mechanically bonded to insert bodies via forces generated through deformation of mating geometric features on the insert body and abrasive tip, creating inserts of any variety of shape, size, or thickness, attachable to a wide variety of tool holders for use in turning, milling, boring, sawing, and drilling applications. The novel mechanically bonded insert of the present invention may contain multiple abrasive tips (limited only by insert shape) and does not require external clamps, body wedges, nor fixture constraints.

Abrasive Tips for use in the Tool Insert of the Invention. The abrasive tip may comprise any material that can be used in machining, cutting, or drilling applications, including but not limited to silicon nitride, silicon carbide, boron carbide, titanium carbide-alumina ceramics such as titanium carbide, fused aluminum oxide, ceramic aluminum oxide, heat treated aluminum oxide, alumina zirconia, iron oxides, tantalum carbide, cerium oxide, garnet, cemented carbides (e.g. WC—Co), synthetic and natural diamond, zirconium oxide, cubic boron nitride, laminates of these materials, mixtures, and composite materials thereof. These materials can be in the form of a single crystals or sintered polycrystalline bodies. Generally, the abrasive tip can be any material that is less deformable (harder) or more abrasion resistant than the material comprising the workpiece material, and will typically be more abrasion resistant than the material comprising the insert body.

In one embodiment of the invention, the abrasive tip has a thickness that is similar to that of the insert body. This combination allows use of the top and bottom cutting edges from one mechanically bound abrasive tip. These thick tips can be in the form of single crystals, sintered polycrystalline bodies, or laminate bodies with the abrasive material on the upper and lower layers of the assembly (FIG. 6B, 72, 73, 75).

Abrasive compacts or blanks comprising polycrystalline diamond (PCD) or polycrystalline cubic boron nitride (PCBN) are commercially available from a number of sources, including General Electric Company under the trade names COMPAX® and BZN®, respectively. PCD and PCBN compacts may be self-bonded, or may include a suitable bonding matrix of about 5% to 80% by volume. The bonding matrix is usually a metal such as cobalt, iron, nickel, platinum, titanium, chromium, tantalum, copper, or an alloy or mixture thereof and/or carbides, borides, or nitrides or mixtures thereof. The matrix additionally may contain recrystallization or growth catalyst such as aluminum for CBN or cobalt for diamond.

In one embodiment of the invention, the compacts are PCBN discs having a thickness of 1 to 15 mm. In a second embodiment, the PCBN compacts have a thickness of 1.6 to 6.4 mm. The forming of the compacts can be done via processes known to the art including Electro Discharge Machining (EDM), Electro Discharge Grinding (EDG), laser, plasma, and water jet. Geometries of cut pieces can be predetermined and computer controlled to maintain tight tolerances.

In one embodiment, the PCBN blank is formed into shape via means of an abrasive water jet. In another embodiment of the invention, the PCBN blank is laser-etched at selected positions on the surface according to a predetermined computer controlled pattern, e.g., forming a polygonal shape with two of the sides forming a 80° triangle with 5.0 mm cutting edge length, and the rest of the straight sides forming a zigzag shape for subsequent interlocking with the mating feature in the insert body.

In one embodiment of the invention, the abrasive tip has a cutting edge with a length "a" of 0.5 mm to 25.4 mm, comprising angles of 20 to 90° in any plane of reference. In a second embodiment, the abrasive tip is of thickness of about 0.5 mm to 7 mm. The abrasive tip may be a circle, oval, octagon, hexagon, partial or complete ring shape (78 in FIG. 8D), or any shape, or size used in cutting tools. FIG. 11 *a*) illustrates the abrasive tip having a circular shape; FIG. 11 *b*) illustrates the abrasive tip having an oval shape; FIG. 11 *c*) illustrates the abrasive tip having an octagonal shape; and FIG. 11 *d*) illustrates the abrasive tip having a hexagonal shape.

Figure 8A:
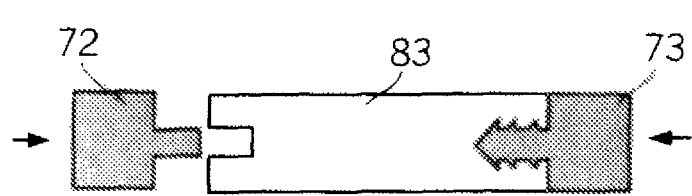
FIGS. 8A, 8B, and 8C illustrate cross-sectional views of some of the embodiments of the insert of the present invention.
Figure 8D:
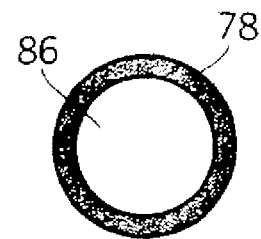
FIGS. 8D, 8E, and 8F illustrate top views of some of the embodiments of the invention.
Figure 8B:
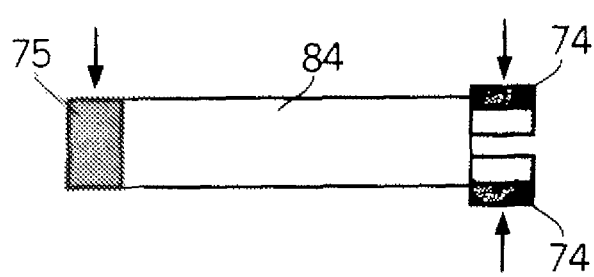

Multi-tipped inserts according to the present invention may be formed with separate fitted abrasive tips as illustrated in FIG. 8B, with tips 74 being inserted from opposite sides of the female feature on the insert body 84. Alternatively as illustrated in FIGS. 6B and 7, a single, dual-sided or solid (i.e., not supported) abrasive tip 31 with a thickness similar to that of the insert body 32 can be pressed all the way through the female feature to form cutting edges on the top and bottom of the insert.

Figure 8E:
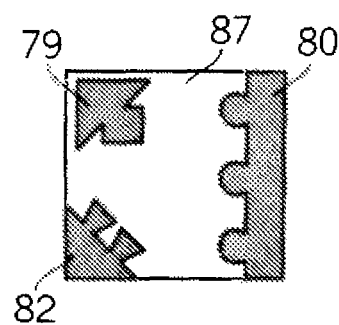

In another embodiment as illustrated in FIG. 8E, the abrasive tips 79 may be inserted into the insert body 87 in 'holes' with no revealed tip at the edge or corner. The amount of hard tip material exposed for cutting would be determined by finish grind, thus eliminating the need to accurately pre-shape the tip prior to insert assembly, minimizing the amount of hard material that needs to be ground.

Figure 8C:
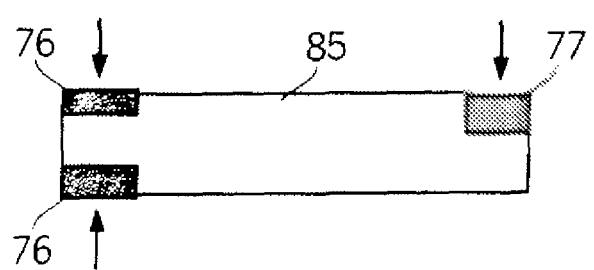
Figure 8F:
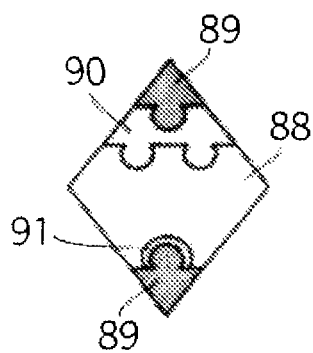

Tool Insert of the Invention. The abrasive tip as described above may be used in tool inserts having a number of shapes or three-dimensional forms known in the tooling art, including but not limited to ANSI insert shape designations of Square as illustrated in FIGS. 1 and 5, Triangle, Diamond (Rhombic as illustrated in FIG. 8F), Parallelogram, Hexagon, Octagon, Pentagon, Trigon, Rectangle, Round as illustrated in FIG. 8D with insert 86, donut shape and inverse, and Trapezoidal or any commonly used thickness or inscribed diameter size.

In one embodiment, the tool insert body is ground to variety of shapes including hones, chamfers, wipers (multiple nose radii), rake angles, clearance angles, and the like known to the art without limit. In another embodiment of the invention, the tool insert body may include chip-breaking patterns, alignment holes, or chamfers within or on its body. FIGS. 12 *a*) (top view) and 12 *b*) (side view) depict an example of a chip breaking pattern. In FIGS. 12 *a*) and 12 *b*), cutting tip 100 includes cutting edge 101, base 102 and cut-out portion 103.

The insert body may be made of any material, including but not limited to cemented carbides, steel, titanium, plastic, or ceramics, so long as it is strong and stiff enough to hold the abrasive tip rigidly subject to the forces and heat involved in the cutting operation, and that it does not crack in assembly.

In yet another embodiment of the invention, the insert body comprises a high heat moldable thermoplastic material or thermoset material such as polyetherimide, polyamide, phenolic resin, and the like, having sufficient heat, ductile and strength properties to hold the tip with adequate compression during metal cutting.

In one embodiment, the material comprising the insert body is a material that is heat resistant, stiff (high modulus), high strength, high ductility and easily formed to precise dimension and shape. In yet another embodiment, the insert body is a cemented carbide, comprising tungsten, titanium, or tantalum carbide particles, or a mixture thereof, which are bonded together with a binder of between about 6% to about 25% by weight of a metal such as cobalt, nickel, or iron, or a mixture or alloy thereof. In another embodiment, the insert body comprises a metallic material such as tool steel, stainless steel or titanium.

In some instances wherein a stiff and hard material is used for the insert body, e.g., a ceramic or cemented tungsten carbide, and depending on the level of interference fit required to generate adequate holding forces, cracking can be induced in such materials. In these instances, an intermediate material or feature may used to sacrificially deform and reduce the tendency for hard and brittle insert bodies to crack upon assembly. As illustrated in FIG. 8F, intermediate mating geometric features 90 and 91 are provided between the abrasive tip 89 and the insert body 88. The intermediate mating feature may comprise materials such as steel, titanium, or a grade of cemented carbide with a greater toughness than the material that makes up the insert body.

The insert body of the invention and corresponding (female) feature may be formed via any process known to the art including EDM, EDG, laser, plasma, stamping, and water jet. In another embodiment of the invention, the holder can be formed via a process called Rapid Omni Directional Compaction (ROC), which is a process for consolidating high-performance pre-alloyed powders into fully dense part. An ROC process is disclosed in U.S. Pat. No. 5,594,931, for a process to produce shapes with fine microstructures.

Geometric Features of the Joint. There are an unlimited number of geometrical arrangements that can be utilized to bond the abrasive tip to the insert body in the inserts of the invention. Since the abrasive tip is more heavily abused during the application of the insert in a cutting process, it is preferable, but not required, to have the male, i.e. protruding, geometric feature on the abrasive tip and the mating female feature on the insert body. This places the abrasive tip material under compression rather than tension.

FIGS. 4-8 illustrate various embodiments of the invention, in which the insert body (32, 49, 83-88) has an opening or female feature for receiving an abrasive tip (31, 41-48, 72-82 with mating geometrical features). As shown, the mating geometrical features can be either interlocking or non-interlocking. FIG. 5B is an example of non-interlocking features (45-48). FIGS. 5A, 6, and 7 are examples of interlocking features. In a number of applications, interlocking features are preferable over non-interlocking, as they provide additional holding force along all directions except that of insertion. FIG. 6A is an example of an interlocking feature in the form of a dovetail joint.

In yet another embodiment of the invention (not shown), the abrasive tip has a flaring tenon or a lip, which fits tightly with a mating socket on the holder for receiving the lip on the abrasive tip and forming an interlocking joint. In yet another embodiment, the joint or mating surface, has rounded shape or circular pattern as illustrated in FIGS. 6B and 7, wherein the circular shape improves cutting rates and toughness of the joint by eliminating sharp corners or tight radii. In another embodiment, the abrasive tip 44 is in the form of a "wedge." This geometry includes no sharp edges or tight corners and is thus convenient for attaching abrasive tips that are very small compared to the insert body.

The area of the abrasive tip that is in contact with the insert body may be varied depending on the required mechanical holding force for the tip. For low-speed high cutting rate applications, and non-rigid machine tools, a larger holding force may be required. A large force requires larger contact area between abrasive tip and insert body and/or larger interference. Contact area can be adjusted with shape or simply dimension of that portion of the tip that will be used solely to hold the tip. The details of the abrasive tip, e.g., shape, angle, size, nose radius etc., are independent of the details of the insert body contact area used for bonding the tip. Dimensional and asperity irregularities e.g., burrs, roughness in the female feature of the insert body and on the abrasive tip can, in some cases, improve the mechanical grip.

In one embodiment of the invention the abrasive tip is tapered, i.e., the top or bottom side is smaller in dimension than the other. Taper improves alignment of the abrasive tip in the insert body female feature prior to press or shrink fit. Taper may be up to 10° or more, with 0.1 to 0.5 degrees preferred. Excessive taper lowers the average mechanical bonding force and concentrates it on certain regions the abrasive tip. The force may become too concentrated and crack the tip or too low and allow the tip to displace during cutting. Insufficient taper makes pre-fitting difficult, increasing the likelihood of misalignment and destruction of the holder upon press or shrink fit. The taper may be of any profile including but not limited to linear, rounded or curved, bilinear, or a combination of shapes.

Figure 4:
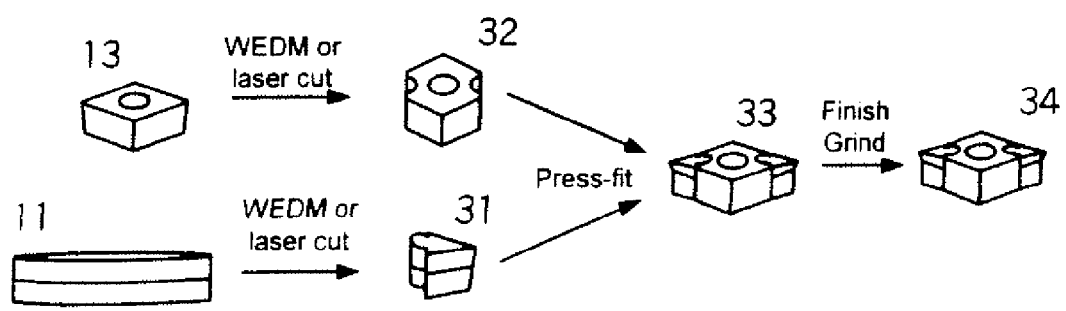
FIG. 4 is a diagram illustrating one embodiment of the process of the present invention for mechanically bonding an abrasive tip to an insert body, for forming an embodiment of the tool insert of the invention.

As illustrated in FIGS. 4, 6B, and 7, the female feature in the insert body may extend through the entire thickness, thus forming a hole or cutout section and allowing cutting edges to be on both the top and bottom of the abrasive tip. In this arrangement, a single abrasive tip can provide two times the number of cutting edges, i.e., the inserts of FIGS. 6B and 7 can have four cutting edges rather than two. Alternatively, two abrasive tips 74 can be inserted into a single female feature on an insert body providing cutting edges on the top and bottom of the insert as depicted in FIG. 8B. In another embodiment as illustrated in FIG. 8C, the female feature (76, 77) only goes partially through the insert body. In yet another embodiment as illustrated in FIG. 8A, the female feature (72, 73) does not penetrate the top or bottom surface of the insert body.

FIG. 14 shows the tip 108 having a generally trapezoidal anchor portion 110 with its base substantially flat and spaced away from a cutting edge of the cutting tip.

The mating surfaces can be of simple geometry such as illustrated in FIG. 8A between the tip 72 and the insert body 83, or of more complex geometry as in the threaded or barbed example also illustrated in the same Figure, between the tip 73 and the insert body 83. The mating direction of the female feature in the insert body and corresponding feature on the abrasive tip (72, 73) can be horizontal as illustrated in FIG. 8A, or perpendicular as illustrated in FIG. 7, or of any intermediate angle with respect to the plane of the insert.

Process for Forming the Inserts of the Present Invention In the process of the present invention, the abrasive tip is joined with, i.e., mechanically bonded to, the insert body via primarily "mechanical" forces generated through deformation of mating geometric features on the insert body and abrasive tip. There may be other forces, e.g., adhesive forces, being present or generated in the process of joining the tip with the insert body. However, it is primarily the mechanical forces that securely hold the abrasive tip in the insert body. The mechanical forces can be generated by a number of techniques.

In one embodiment of the invention, a surprisingly simple and effective technique is used as illustrated schematically in FIG. 4, for a "press-fit" joint to secure the tip in the insert body. As shown in the Figure, abrasive tip 31 and insert body 32 having mating geometrical features are mechanically joined by lining up the mating geometries and pressing the pieces together via an applied force. Precise dimensional control of the mating geometric features is used to firmly hold the abrasive tip 31 in the insert body 32, forming the semi-finished insert 33. The semi-finished insert 33 can then be finish ground to final tool geometry 34 by standard methods known in the art.

The insert body may be finish ground, polished, or otherwise further machined to remove irregularities, asperities etc, in its shape to aid in fit. The finish grinding or shaping of the insert body may be carried out using any of the processes including but not limited to wire EDM (WEDM), milling, PM sintering, sintering and forging, forging, stamping, casting, and molding.

In a second embodiment of the invention, the technique used is an "interference fit" for a holding force to be applied across the mating features on the abrasive tip and insert body. For an interference fit, the cross-sectional area of the male mating feature is slightly larger than that of the female feature at some point along the direction of insertion. Interference fits can cause reversible or irreversible deformation of the male and/or female mating feature, depending on the extent of the size mismatch and the yield strength of the mating materials. In practice, the amount of plastic deformation can be controlled through appropriate choice of this size mismatch.

In certain applications, an interference fit that results in irreversible deformation of the insert body and/or abrasive tip is chosen as this ensures that the bonding force between the said abrasive tip and insert body is higher and more consistent (insert-to-insert) than if all deformation was elastic and reversible. If an abrasive tip that had been irreversibly press-fit into an insert body were removed and reinserted, the reinsertion would require less force than was required in the original assembly. The abrasive tip and/or insert body would have deformed irreversibly, reducing the dimensional mismatch between the male and female mating features after disassembly.

It should be noted that irreversible deformation in the abrasive tip and/or insert body can also occur upon press fitting if the mating features have dimensional asperities, surface roughness, burrs, scratches, or other irregularities. These imperfections can result in local areas of high stress, exceeding the yield strength of the material and resulting in plastic deformation. For this reason, some level of dimensional asperity is desirable, as it increases the bonding force between the mating geometric features.

In yet a third embodiment of the invention, the mechanical forces for bonding the abrasive tip to the insert body is generated by a "shrink fitting" technique. In this technique, mating geometric features are formed in the insert body and abrasive tip using processed known in the art. For shrink fitting, the dimensions of the female feature are left slightly smaller than those on the male feature. The female feature is then heated to a temperature that causes thermal expansion that is sufficient to fit the male feature into the mating female feature. Upon cooling the assembly to room temperature, the abrasive tip and insert body will be firmly bonded together. Depending upon the dimensional mismatch of the mating features at ambient temperature, shrink fitting can also generate either reversible or irreversible deformation of, and holding forces between, the insert body and/or abrasive tip. Shrink fitting can also be achieved by means of a volume change in the material comprising the abrasive tip and/or insert body resulting from a phase transition.

In yet a fourth embodiment of the invention, the abrasive tip and insert body are shaped concurrently in one operation, employing processes known in the art such as co-sintering or casting, insert or overmolding, or stamping, forging. In one embodiment of this technique, the female feature in the insert body is punched-through or stamped by the abrasive tip, i.e., analogous to a nail (the "abrasive tip") in wood (the "insert body"), thus eliminating the need to pre-shape the female feature accurately.

In one embodiment of any of the techniques above the assembled insert is heated to further shrink and harden the insert body to increase compression after press-fit and cooling. In one embodiment of this process, the insert body is preheated or abrasive tips pre-cooled to alter their dimension prior to press fit and increase force by thermal-elastic strains.

In yet another embodiment of any of the techniques above, a supplemental, third-body wedge may be added between the abrasive tip and insert body to, for example, prevent creep of the abrasive tip back out of the insert body and augment compression of the tip. In yet another embodiment, after mechanical bonding is established through methods described above, a spot weld (point of braze or solder) may be introduced to further assure that the tool tip is locked or held firmly in the holder.

In yet another embodiment of any of the techniques above, a wedge in the form of a thin adhesive film or a thin metal foil or coating, e.g., Pb or Sn, is placed in the insert body prior to the press-fitting of the abrasive tip, thus ensuring void-free contact at all surfaces and augmenting the mechanical force by adhesion. Thin metal foils are commercially available from various sources including Wesgo, Allied Signal, and Vitta in thicknesses ranging from 0.0005 to 0.003 inches or more. In another example, an adhesive paste, wax, or liquid is used instead of a foil to ensure void-free contact and add an adhesive force to the mechanical force holding the abrasive tip into the insert body. Adhesive materials for use in ceramic bonding are commercially available from a number of sources, including Durit® Metal-Adhesive Powder/Liquid from Bonadent, GmbH, and Ceramabond™ from Aremco Products, Inc.

Surface forces from adhesion, friction, or asperity yielding may be exploited to improve the strength of the bond between the abrasive tip and the insert body. However, surface forces may exceed the tensile strength of the abrasive tip or insert body, causing an undesirable crack or chip. In yet another embodiment of any of the techniques above, surface forces with resulting non-uniform stresses that could cause local chips and cracks are mitigated by the use of dry or wet lubricants such as graphite, hBN, oils, metallic soaps. These or other lubricants may be used to facilitate the fit of the abrasive tip into the insert body without reducing the wedge action and mechanical force due to material yield.

In another embodiment of the technique of the present invention, the mechanical forces for bonding the abrasive tip to the insert body can also be generated by using a high-temperature moldable polymer as the insert body and directly molding the insert body around the abrasive tip. Subsequent chemical shrink from cure and/or thermal shrink create a mechanical force to hold the tip rigidly in the insert body. The molding can be any of the processes known in the art including casting, molding, and over-, co- or insert-molding and can be augmented by hydraulic compression. A molding process can eliminate assembly cost and the cost of precision shaping of the insert body and abrasive tip. In yet another embodiment of any of the techniques above, the tool insert can be further processed by thermal processing to further harden the insert, e.g., heating the tool insert at a temperature of at least 300° F. In still another embodiment of any of the above techniques, the additional processing step may include coating the tool insert via known coating techniques known in the art, e.g., a chemical vapor deposition technique, a physical vapor deposition technique, a thermal spray technique, a spraying technique using an air sprayer, a thermal injection technique, with a coating layer comprising at least one of a nitride, carbide, carbonitride, oxide, boride, or oxynitride of elements selected from a group consisting of B, Ti, Al, Si, Ga, refractory hard metals, transition metals, and rare earth metals, or complexes and combinations thereof. In one embodiment, the coating layer is at least one of aluminum nitride, titanium aluminum nitride, titanium nitride, titanium aluminum carbonitride, titanium carbide, silicon carbide, and silicon nitride. In another embodiment, the coating is aluminum nitride, applied via a CVD process.

Applications of the Mechanically Bonded Insert of the Invention. The mechanically bonded inserts of the present invention can be used in a number of tooling operations including but not limited to cutting tools; single-point tools, multiple-point tools such as a drill, a reamer, a milling cutter, a broach, a saw and a shank, and grinding tools. FIG. 13 depicts the insert 104 in a drill bit 106 (side view). These include applications that normally use brazed inserts or conventional solid inserts (e.g., carbides, ceramics, etc.,), as well as applications that typically cannot use inserts for a number of reasons, including braze quality.

EXAMPLES

The examples below and as generally illustrated by the Figures are merely representative of the work that contributes to the teaching of the present invention, and the present invention is not to be restricted by the examples that follow.

Example 1

Two mechanically bonded inserts are prepared by the press-fit embodiment with mating and interlocking dovetail geometry similar to that pictured in FIG. 6A. The abrasive tip material is available from General Electric Company of Worthington, Ohio, as BZN® HTM2100 blank in a carbide supported form with PCBN layer thickness of 0.039" and the overall thickness of 0.126". Abrasive tips with an 80° cutting corner and 5 mm leg length are next cut from the blank by WEDM. The male, dovetail shaped mating feature is 0.149" wide, 0.059" deep, with 45° corners. The dovetail feature is WEDM cut with a 0.1° taper to facilitate fitting in the female feature of the insert body. The direction of the taper is from PCBN surface to carbide surface, so that the carbide side of the male feature is slightly smaller than the PCBN side. The insert body material is unhardened A2 tool steel with Rockwell Hardness A of 52 to 55. Female featured insert bodies are fabricated by WEDM out of steel plates with 0.126" or 0.189" thickness. After manually positioning the carbide end of the abrasive tip squarely in the opening of the female feature, the pieces are pressed together with a manual arbor press.

For the comparable examples, conventionally brazed inserts are fabricated from cemented tungsten carbide insert bodies and the same PCBN material, using standard procedures familiar to those skilled in the art. The press fit and brazed inserts are then finish ground via standard insert grinding techniques to final specifications for a CNGA422 with 25°×0.004" chamfer and a light hone.

The inserts are evaluated in an accelerated turning test that simulates gear OD turning. All inserts are clamped onto a standard tool holder, with standard insertion into a machine tool turret. A notched steel cylinder made from 4340 hardened steel HRC62-65, six inches in diameter and two feet long, comprising 6 notches, is machined by lathe turning with the inserts. All tests are conducted using a 0.010-inch depth of cut, a 0.005 inch per revolution feed rate, with a cutting speed of 361 feet per minute. The inserts cut the steel workpiece in one-minute intervals, after which the flank wear in inches (an indicator of tool blunting or wear, inference to tool cutting life) are measured.

Figure 9:
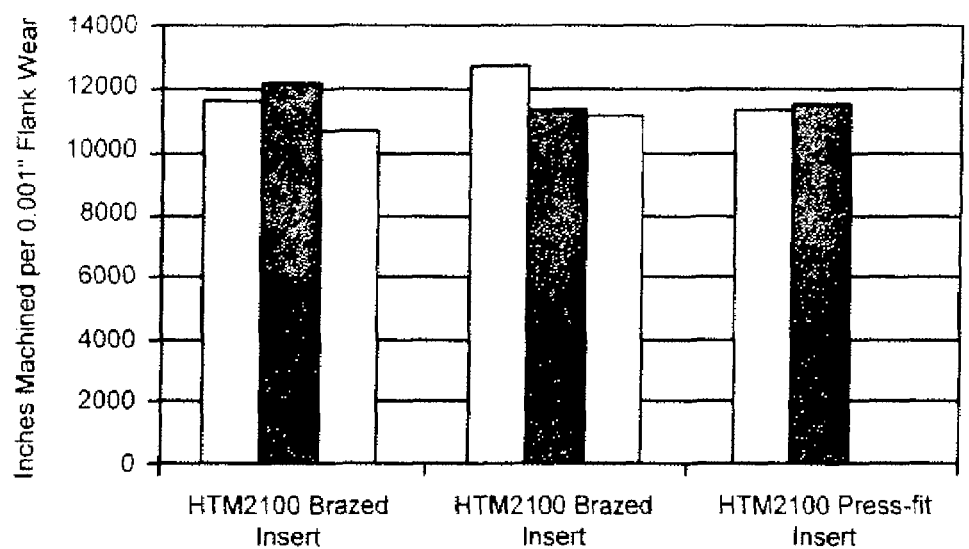
FIG. 9 is a graph comparing the cutting life, in inches of steel machined per 0.001" of tip flank wear, of the pressed fit insert utilized an interlocking dovetail geometry in FIGS. 5 and 6, with brazed inserts in the prior art.

The results of the machining test are illustrated in FIG. 9, indicating that the press-fit inserts of the present invention are comparable in performance to the brazed inserts of the prior art.

Example 2

In this example, several multi-tipped, mechanically bonded inserts of the present invention having mating circular features similar to that depicted in FIG. 7 are prepared using the same procedures and materials as in Example 1 unless indicated otherwise.

Seven, two-tipped inserts are made from tungsten carbide supported BZN*HTM2100 and insert bodies with two circular offset holes at opposite 80° corners. The offset holes are 0.088" in diameter and offset from the edge of the insert body by 0.026". Two mating abrasive tips with taper of 0.3 to 0.5 degrees are press-fit into each insert body to produce two-tipped inserts. A four-tipped insert as illustrated in FIG. 6B is also fabricated with identical geometry by replacing the carbide supported HTM2100 abrasive tips with a specially prepared, solid unsupported version of HTM2100 with a thickness of 0.189". The exact dimensions of the insert bodies and abrasive tips are of varying levels of interference, in the range of 0.1 to 25 lbs-force with an average interference of a positive 0.0002" and 0.0003" for depth and the ID of the tip respectively.

These inserts are then finish ground to final specifications for a CNGA432 with 25°×0.004" chamfer with a light hone and subjected to the same machining test described in Example 1.

Figure 10:
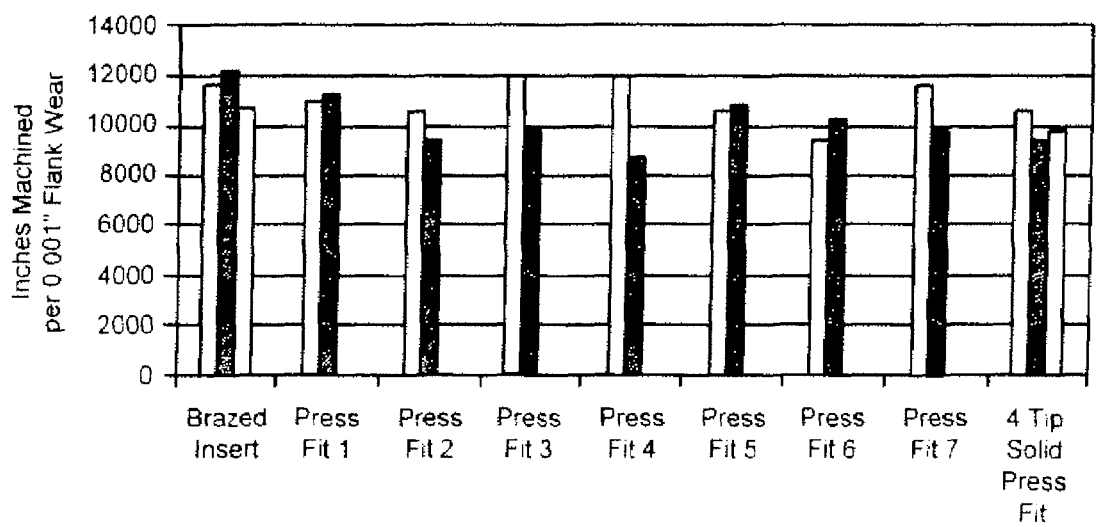
FIG. 10 is a graph comparing the machining performance of the tools of the present invention (as shown FIGS. 6-7) with the prior art tools, measured as inches of steel removed per 0.001" of flank wear.

FIG. 10 compare performance data from the mechanically interlocked inserts of the present invention with conventionally brazed tools. The results also show that the press force and gap (in the abrasive tip/insert body fit) in the range selected play no major role in tool life, within normal test uncertainty. Furthermore, the inserts of the present invention, within errors in the test, give comparable performance to the brazed inserts of the prior art.

Example 3

A press-fit assembly taken from Example 2 is heated at 800° C. for 2 hrs in flowing argon. The furnace tube is not fully purged of ambient air, so the insert is visibly oxidized but not chipped or cracked. A visual inspection shows that the abrasive tip still being held strongly in the insert body.

The thermally treated press-fit insert is next tested in the same lathe turning test described in Example 1. The wear rate of the thermally-treated press-fit insert is comparable to the unheated press-fit assemblies in Examples 1 and 2, i.e., with no deleterious increase in flank wear, thus demonstrating the feasibility of thermal processing of the novel press-fit insert assembly of the invention.

Some of the preferred embodiments have been set forth in this disclosure for the purpose of illustration. However, the foregoing description should not be deemed to be a limitation on the scope of the invention. Accordingly, various modifications, adaptations, and alternatives may occur to one skilled in the art without departing from the spirit and scope of the claimed inventive concept.

All of the patents, patent applications, articles, and texts mentioned above are incorporate herein by reference.

What is claimed is:

1. A cutting insert comprising:
a cutting insert body having a plurality of openings;
a plurality of cutting tips, each of the plurality of cutting tips disposed in a respective opening, the cutting tips including an intermediate feature and a tip portion, the intermediate feature having a geometry that provides a mechanical bond when inserted into an opening of the cutting insert body, the intermediate feature formed of a different material than the tip portion, and the tip portion comprising a superabrasive material and having a cutting edge,
wherein said cutting tip is retained in the insert body primarily by mechanical forces derived from irreversible deformation of the mating geometrical features on insert body and/or cutting tip; and
a spot weld between each of the cutting tips and the cutting insert body.

2. The cutting insert of claim 1, wherein the geometry comprises a generally trapezoidal anchor portion with its base substantially flat and spaced away from a cutting edge of the cutting tip.

3. The cutting insert of claim 1, wherein the superabrasive material comprises cubic boron nitride or polycrystalline diamond.

4. The cutting insert of claim 3, wherein the tip portion further comprises at least one of a metal, alloy, or mixture thereof or a carbide, boride or mixture thereof.

5. The cutting insert of claim 1, wherein the tip portion comprises cubic boron nitride or polycrystalline diamond particles and a bonding matrix comprising a metal or alloy thereof.

6. The cutting insert of claim 1, wherein each cutting tip comprises two cutting edges.

7. The cutting insert of claim 1, wherein the geometry is in the form of a dovetail.

8. The cutting insert of claim 7, wherein each cutting tip comprises a circle, oval, octagon, hexagon, or partial or complete ring shape.

9. The cutting insert of claim 1, wherein the geometry of each cutting tip comprises a male feature that is shaped to fit within a female feature of the insert body.

10. The cutting insert of claim 9, wherein the male feature comprises a flaring tenon, lip, rounded shape, circular pattern, or wedge.

11. The cutting insert of claim 1, wherein the cutting insert body comprises a cemented carbide, steel, titanium, plastic, ceramic, metal or metal alloy.

12. The cutting insert of claim 1, wherein the cutting insert is in the shape of a square, triangle, diamond, parallelogram, hexagon, octagon, pentagon, trigon, rectangle, trapezoid or round body.

13. The cutting insert of claim 1, wherein each opening has a shape that is a mating geometric feature to the geometry of at least one of the cutting tips.

14. The cutting insert of claim 1, wherein the cutting insert comprises a coating.

15. The cutting insert of claim 1, wherein the cutting insert comprises a chip-breaking pattern.

16. The cutting insert of claim 1, wherein the cutting insert comprises two cutting edges.

17. The cutting insert of claim 1, wherein the cutting insert comprises four cutting edges.

18. The cutting insert of claim 1, wherein the cutting tips are arranged symmetrically about the insert body.

19. The cutting insert of claim 1, wherein the cutting insert is a turning insert.

20. The cutting insert of claim 1, wherein the cutting insert is disposed on a drill.

* * * * *